United States Patent
Persson

(10) Patent No.: US 10,527,361 B2
(45) Date of Patent: *Jan. 7, 2020

(54) HEAT EXCHANGER

(71) Applicant: Danfoss A/S, Nordborg (DK)

(72) Inventor: Lars Persson, Zhejiang (CN)

(73) Assignee: Danfoss A/S, Nordborg (DK)

( * ) Notice: Subject to any disclaimer, the term of this patent is extended or adjusted under 35 U.S.C. 154(b) by 187 days.

This patent is subject to a terminal disclaimer.

(21) Appl. No.: 14/938,042

(22) Filed: Nov. 11, 2015

(65) Prior Publication Data

US 2016/0102923 A1 Apr. 14, 2016

Related U.S. Application Data

(63) Continuation of application No. 13/751,208, filed on Jan. 28, 2013, now Pat. No. 9,234,710.

(30) Foreign Application Priority Data

Feb. 7, 2012 (DK) .................................. 2012 00103

(51) Int. Cl.
| | |
|---|---|
| *F28F 3/08* | (2006.01) |
| *F16J 15/06* | (2006.01) |
| *F28F 3/10* | (2006.01) |
| *F16J 15/10* | (2006.01) |

(52) U.S. Cl.
CPC ............... *F28F 3/08* (2013.01); *F16J 15/062* (2013.01); *F28F 3/10* (2013.01); *F16J 15/10* (2013.01); *F16J 15/104* (2013.01)

(58) Field of Classification Search
CPC ..... F28F 3/10; F28F 3/08; F16J 15/062; F16J 15/10; F16J 15/104
USPC .................................................. 165/166, 167
See application file for complete search history.

(56) References Cited

U.S. PATENT DOCUMENTS

| | | | |
|---|---|---|---|
| 4,432,415 A | * | 2/1984 | Wright ...................... F28F 3/10 165/166 |
| 4,635,714 A | | 1/1987 | Almqvist et al. |
| 6,062,305 A | | 5/2000 | Persson |
| 7,490,660 B2 | | 2/2009 | Song |

OTHER PUBLICATIONS

Indian Office Action for Serial No. 220/DEL/2013 dated Apr. 27, 2018.

* cited by examiner

*Primary Examiner* — Joel M Attey
(74) *Attorney, Agent, or Firm* — McCormick, Paulding & Huber PLLC

(57) ABSTRACT

A heat exchanger is provided comprising a stack of heat exchanger plates (1, 1a, 1b, 1c) formed of sheet metal having a three-dimensional structured pattern (2, 3), each heat exchanger plate (1, 1a, 1b, 1c) having a groove (10), a gasket (9) being arranged in said groove (10) and resting against an adjacent heat exchanger plate (1a), said groove (10) having a bottom inner surface (11), said inner surface-bottom (11) having at least a protrusion (14, 15) directed to said adjacent heat exchanger plate (1a). It is intended to minimize the risk of a leakage. To this end in the region of said protrusion (14, 15) said gasket (9) is compressed more than in a region out of said protrusion (14, 15).

20 Claims, 4 Drawing Sheets

HEAT EXCHANGER

CROSS REFERENCE TO RELATED APPLICATION

This application is a continuation of U.S. patent application Ser. No. 13/751,208 filed Jan. 28, 2013 which claims foreign priority benefits under U.S.C. § 119 from Danish Patent Application No. PA 2012 00103 filed on Feb. 7, 2012, the contents of both applications are incorporated by reference herein.

TECHNICAL FIELD

The present invention relates to a heat exchanger comprising a stack of heat exchanger plates formed of sheet metal having a three-dimensional structured pattern, each heat exchanger plate having a groove, a gasket being arranged in said groove and resting against an adjacent heat exchanger plate, said groove having a bottom, said bottom having at least a protrusion directed to said adjacent heat exchanger plate.

BACKGROUND

Such a heat exchanger is known from U.S. Pat. No. 7,490,660 B2. The gasket has a recess which fits to the protrusion. At the side facing the adjacent heat exchanger plate the gasket has a protrusion fitting in a recess which is formed on the lower side of the adjacent heat exchanger plate. The recess is the negative form of the protrusion on the upper side of the adjacent heat exchanger plate.

The space between the heat exchanger plate and the adjacent heat exchanger plate forms part of the primary flow path or part of a secondary flow path through the heat exchanger. The gasket seals the flow path from the outside or in the region of supply and return openings of the heat exchanger plates from the other flow path.

In order to achieve a good heat transfer from one flow path to the other flow path the heat exchanger plates are relatively thin. This causes a problem in that the pressure of the fluid within a flow path may deform the heat exchanger plate. This is especially the case in the area around the openings forming a supply or a return opening, respectively, of the respective flow paths. In the region of these openings, there is in many cases no sufficient connection between a heat exchanger plate and the adjacent heat exchanger plate.

The solution disclosed in U.S. Pat. No. 7,490,660 B2 helps to keep the gasket in position, i.e. between the groove of the heat exchanger plate and in the recess of the adjacent heat exchanger plate. Furthermore, the sealing line has been made longer than without the recesses and protrusions. However, when the heat exchanger plate deforms under the pressure in one of the flow paths, there is still the risk of a leakage when the heat exchanger plate is lifted off the gasket. In this case an opening may appear between the recesses and the gasket, thus giving leaks.

SUMMARY

The task underlying the invention is to minimize the risk of a leakage.

This task is solved in that in the region of said protrusion said gasket is compressed more than in a region out of said protrusion.

When the gasket is mounted between two heat exchanger plates, i.e. between a heat exchanger plate and the adjacent heat exchanger plate, the gasket is compressed a bit in order to rest against a inner surface, such as the top or bottom, of the groove and the lower or upper side of the adjacent heat exchanger plate. However, in the region of the protrusion the protrusion is pressed into the gasket compressing the gasket more than in other regions. To achieve this stronger compression the protrusion is pressed into the gasket with a greater force than in other regions. Even in case the heat exchanger plate or plates deform, the protrusion can move a little bit without leaving contact to the gasket. They form an extra barrier against leaking fluids. The elasticity of the material forming the gasket will just follow the protrusion still forming a fluid tight barrier. Furthermore, the protrusion will push at the gasket that still squeezing it against the adjacent heat exchanger plate even at significant deformation of the plates.

In a preferred embodiment said adjacent heat exchanger plate comprises a lower side facing said heat exchanger plate, a recess being formed in said lower side in the region of the protrusion of said adjacent heat exchanger plate, said gasket being deformed into said recess. In other words, the recess on the lower side of the adjacent heat exchanger plate is the "opposite" form of the protrusion of the upper side of the heat exchanger plate. When the two heat exchanger plates are stacked onto each other the gasket is not only deformed on the side of the heat exchanger plate, but also on the side of the adjacent heat exchanger plate. In this region a gasket is pressed into the recess. Even when the adjacent heat exchanger plate is deformed, the elastic material of the gasket can follow this deformation.

Preferably said protrusion has a height of at least 25% of the thickness of said gasket. The protrusion is pressed over a rather long distance into said gasket so that even heavy deformations do not cause a risk of a leakage.

Preferably said protrusion has at least at the top a triangular form. The top of the triangle forms an edge. This edge should not be too sharp in order not to destroy the gasket. However, this edge is pressed with a rather small area into the gasket so that a great pressure can be realized.

In a preferred embodiment said protrusion has a triangular form. In other words, the complete protrusion is in the form of a triangle.

In a preferred embodiment said protrusion runs along a curved path. The curvature of the curve is parallel to the plane of the heat exchanger plate. This has the further advantage of strengthening the heat exchanger plate.

In a preferred embodiment said heat exchanger plate comprises at least one through-opening and said protrusion runs along a part of the groove surrounding said through-opening partly. As mentioned above, in the region of the through-opening there is the greatest risk of deformation of the heat exchanger plates. In most cases it is sufficient to have the protrusions only in this area and to keep simple the form of the grooves in other areas.

Preferably said groove comprises at least a linear section running parallel to an edge of said heat exchanger plate, said protrusion ending out of said linear section. Usually the heat exchanger plates can be connected along their edges by welding or brazing so that the risk of a deformation of the plates leading to a leakage is rather small in this area. Therefore, the form of the groove in an area along an edge can be kept simple.

Preferably said groove comprises side walls and the bottom of the groove is flat between said side walls and said protrusion. The flat area of the groove can be used to squeeze the gasket only a little bit. In this area there is only a small load on the gasket so that the stacking of the plate can be made without larger forces. However, there is generated a sufficient long sealing line auxiliar to said gasket.

In a preferred embodiment at least two protrusions are arranged in said groove, the bottom of said groove being flat between said protrusions. The reason is the same as mentioned before for the area between the protrusion and the side walls.

In a preferred embodiment at least an auxiliary protrusion is arranged in said groove, said auxiliary protrusion traversing said groove orthogonal to said protrusion. It is a possibility to strengthen the plate in the orthogonal direction of the groove further.

Preferably said protrusion is pressed out of the sheet metal of the heat exchanger plate. Therefore, no additional material is necessary.

In a further preferred embodiment, the grooves instead are 'upwards' hollows, the inner surfaces being a top. The gasket then rests on this raised section, being the top of the raised section of the lower heat exchanger plate, and this lower section then has protrusions reaching into the hollows forming the grooves, thus pressing the gaskets into the hollows deforming it as described above. This embodiment naturally also applies to any of the other embodiments as described.

BRIEF DESCRIPTION OF THE DRAWINGS

The preferred examples of the invention will now be described in more detail with reference of the drawing, wherein.

DETAILED DESCRIPTION

Figure 1:
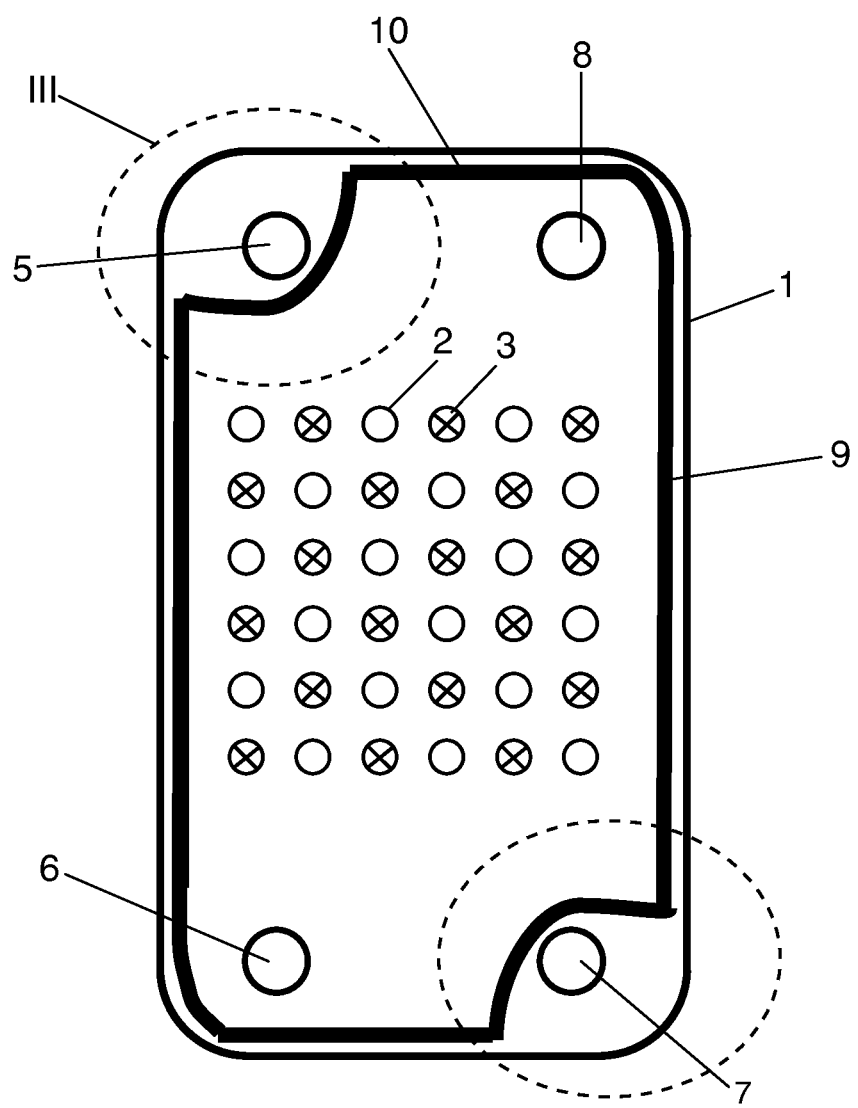
FIG. 1 shows a heat exchanger plate of a heat exchanger stack.

FIG. 1 shows a heat exchanger plate 1. The heat exchanger plate 1 comprises bulges 2 which are raised by a given height over the plane of the heat exchanger plate 1. Furthermore, the heat exchanger plate 1 comprises hollows 3 which are sunk to a given depth in this heat exchanger plate 1. The bulges 2 are symbolized by white circles while the hollows 3 are symbolized by circles with a cross.

As it is known in the art, two such heat exchanger plates 1 form a pair of plates when stacked upon each other. Two such neighbouring plates usually will with be slightly differently shaped, such that when they are stacked, the bulge 2 of one plate meets with hollows 3 of the neighbouring plate, etc.

Flow paths are in this manner formed within such pairs. Typically the flow path formed on one side of a heat exchanger plate 1 will belong to a first flow path, and the flow path formed on the opposite side will belong to a second flow path being sealed from the first flow path.

The heat exchanger plate 1 is made of sheet metal. A sheet metal is a material having a good thermal conductivity and can be formed in a press or die. It is also possible to use plastic materials as sheet metal. The bulges 2 and the hollows 3 form a three-dimensional structured profile or pattern. This pattern is produced in said press or die. However, any other suitable pattern can be used, e.g. a herringbone pattern, as they are well established in the art.

The heat exchanger plate 1 of the illustration comprises four through-openings 5-8. These through-openings 5-8 are used to form channels or connections to the first and second flow paths respectively. For example, the through-openings 5, 7 forms a supply and a return for the first flow path and the through-openings 6, 8 form a supply and a return for the second fluid path.

Figure 2A:
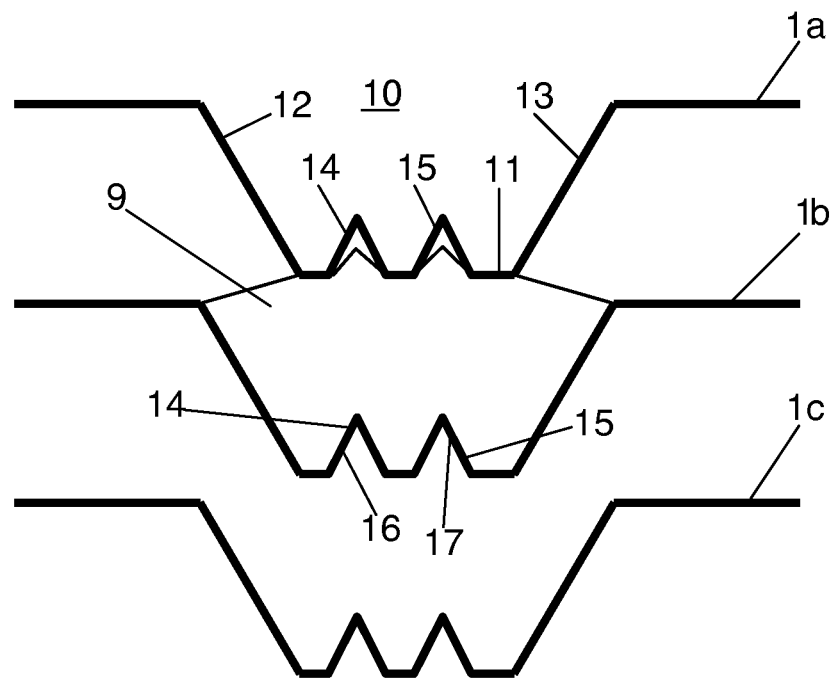
FIGS. 2A and 2B are schematic illustrations to show the form of heat exchanger plates in the region of a gasket groove.
Figure 2B:
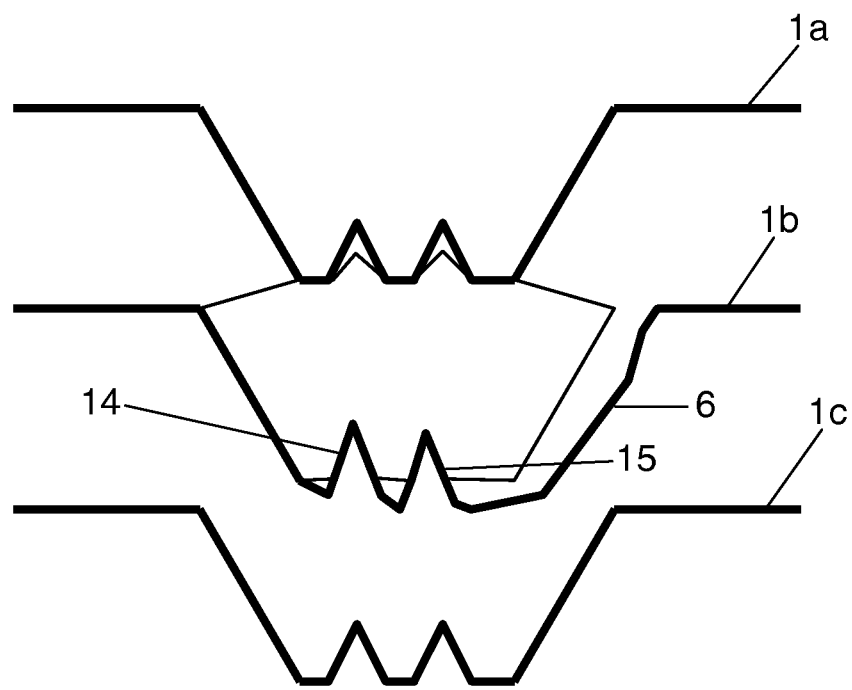

In order to separate the two flow paths from each other a gasket 9 is introduced between two heat exchanger plates. This is shown in FIG. 2a, 2b. FIG. 2 shows three heat exchanger plates 1a, 1b, 1c. To simplify the further explanation the heat exchanger plate 1b is simply termed as "heat exchanger plate" or "first heat exchanger plate". The heat exchanger plate 1a is termed as "adjacent heat exchanger plate" or "second heat exchanger plate".

The gasket 9 has a form that a first set of through-openings 5, 7 is arranged outside a space sealed by the gasket 9 and a second set of through-openings 6, 8 is arranged within the sealing, thus forming e.g. second flow path. The corresponding gasket between the first heat exchanger plate 1b and a third heat exchanger plate 1c is positioned such the openings 5, 7 are sealed, and the openings 6, 8 are left free to the external. In this way it is possible to use the through-openings 5, 7 as supply and return for the first flow path and the through-openings 6, 8 as supply and return for the second flow path.

The gasket 9 is arranged within a groove 10. This groove is shown in more detail in FIG. 2.

The groove 10 has a inner surface 11, in the present illustration being a bottom, and two side walls 12, 13. Two protrusions 14, 15 of the groove 10 of the first heat exchanger plate 1b are directed to the adjacent or second heat exchanger plate 1a. In its opposite or lower side the first heat exchanger plate 1b comprises two recesses 16, 17 in the form of which corresponds to the form of the protrusions 14, 15 which is in the present case a triangle. However, it is possible that only the top of the protrusions is formed as a triangle.

When two heat exchanger plates 1a, 1b are stacked onto each other and the gasket 9 is positioned in the groove 10 of the first heat exchanger plate 1b, the gasket 9 is deformed in the region of the protrusions 14, 15. This deformation results in a compression of the gasket 9 which is stronger in the region of the protrusions 14, 15 than in other regions. To this end the protrusions 14, 15 have a height which ensures a significant deformation of the gasket 9, such as at least 10% 25% of the thickness of the gasket 9, or more preferably at least 20%, or even more preferably at least 25%.

The gasket 9 is deformed into the recesses 16, 17 on the lower side of the second heat exchanger plate 1a. The gasket 9 may be partially deformed into the recesses 16, 17 without fully contacting the plate surface forming the recesses 16, 17.

Therefore, the gasket has a wave like form with regions of stronger compression and regions of a less strong compression.

The inner surface 11 of the groove 10 is flat between the side walls 12, 13 and the protrusions 14, 15. The bottom 11 of the groove 10 is flat as well as between the protrusions 14, 15. In these flat regions (the lower side of the bottom 11 of the groove 10 is flat as well as in these regions) have the effect that the gasket 9 is only slightly compressed in these regions as it is known from the art.

The effect of the protrusions 14, 15 is shown in FIG. 2b. Even when the first heat exchanger plate 1b is deformed under the pressure between the heat exchanger plates 1a, 1b the gasket 9 ensures a tight sealing. Although the heat exchanger plate 1b has been deformed, the protrusions 14, 15 are still positioned within the gasket 9. The elasticity of the material forming the gasket will just follow the protrusions 14, 15 still forming a fluid tight barrier. The protrusions 14, 15 will push at the gasket 9 thus still squeezing it against the second heat exchanger plate 1a, even at a significant deformation of the heat exchanger plate 1b.

Figure 3:
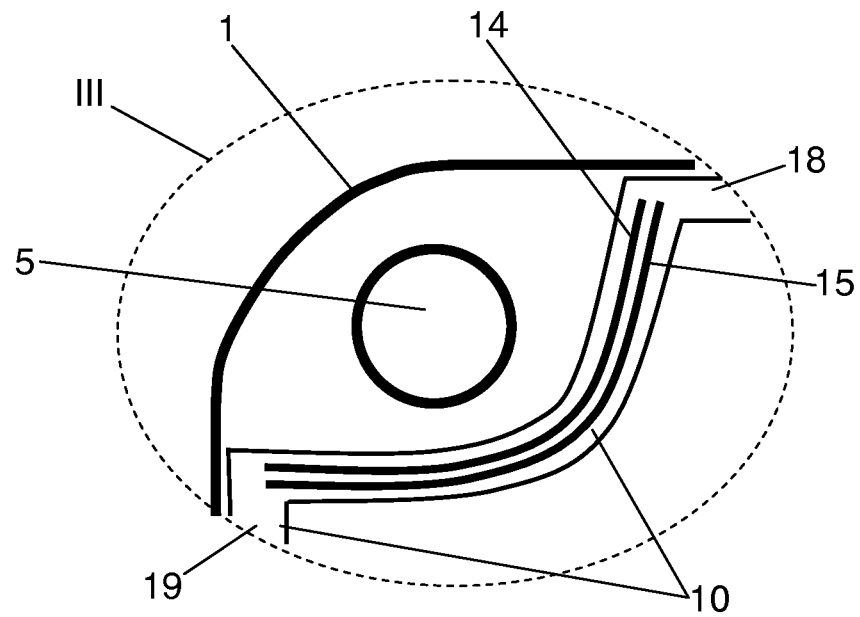
FIG. 3 shows an enlarged view of the detail III of FIG. 1.

FIG. 3 shows a detail III of FIG. 1 in a larger scale without the gasket 9. It can be seen that the protrusions 14, 15 in the groove 10 are restricted to a section of the groove 10 surrounding the through-opening 5 partly. Therefore, the protrusions 14, 15 run along a curved path thus strengthening the heat exchanger plate 1. The groove 10 has at least a linear section 18, 19 running along the edges of the heat exchanger plate 1. The protrusions 14, 15 are restricted to an area out of said linear sections 18, 19.

Figure 4:
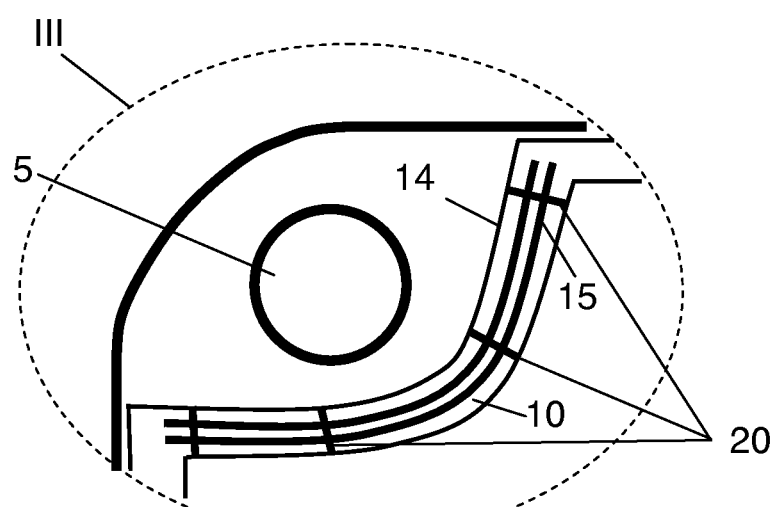
FIG. 4 is an alternative embodiment to the embodiment shown in FIG. 3.

In FIG. 4 a slightly modified embodiment is shown. The same elements have the same reference numerals. In FIG. 4 the gasket is not shown.

Auxiliary protrusions 20 are arranged in the groove 10. These auxiliary protrusions 20 traverse the groove 10 orthogonal to the protrusions 14, 15. These auxiliary protrusions 20 serve to strengthen the heat exchanger plate 1 in the orthogonal direction too.

Figure 5:
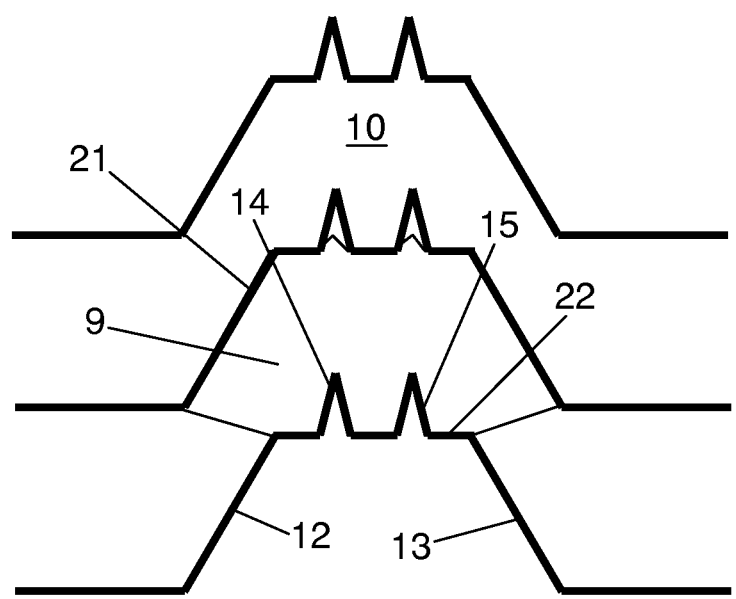
FIG. 5 is an alternate embodiment of FIG. 2A.

FIG. 5 shows an alternative embodiment where the grooves 10 instead are 'upwards' hollows within the walls 12, 13 forming a raised section, the inner surface 11 being a top. The gasket 9 then rests on this raised section, being the top 11 of the raised section of the lower heat exchanger plate, and this lower section then has protrusions 14, 15 reaching into the hollows forming the grooves 10, thus pressing the gaskets 9 into the hollows deforming it as described above.

Any of the embodiments of the FIGS. 1-4 also applies to this embodiment of FIG. 5.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A heat exchanger comprising a stack of heat exchanger plates formed of sheet metal having a three-dimensional structured pattern, each heat exchanger plate having a groove, a gasket being arranged in said groove and resting against an adjacent heat exchanger plate, said groove having a bottom inner surface, said inner surface bottom having at least a protrusion directed to said adjacent heat exchanger plate, wherein in the region of said protrusion said gasket is compressed more than in a region out of said protrusion, wherein said protrusion runs along a curved path in a curved section of the groove, wherein said groove comprises a linear section running parallel to an edge of said heat exchanger plate, wherein said protrusion is not located in the linear section, and wherein said protrusion has a height that provides at least 10% more deformation in the thickness of said gasket in the region of said protrusion than in a region out of said protrusion.

2. The heat exchanger according to claim 1, wherein said adjacent heat exchanger plate comprises a lower side facing said heat exchanger plate, a recess being formed in said lower side in the region of the protrusion of said adjacent heat exchanger plate, said gasket being deformed into said recess.

3. The heat exchanger according to claim 2, wherein said protrusion has a height of at least 10% of the thickness of said gasket.

4. The heat exchanger according to claim 1, wherein said protrusion has a height of at least 10% of the thickness of said gasket.

5. The heat exchanger according to claim 4, wherein said protrusion has a height of at least 25% of the thickness of said gasket.

6. The heat exchanger according to claim 4, wherein said protrusions has a height of at least 15% of the thickness of said gasket.

7. The heat exchanger according to claim 1, wherein said protrusion has at least at the top a triangular form.

8. The heat exchanger according to claim 1, wherein said protrusion has a triangular form.

9. The heat exchanger according to claim 1, wherein said heat exchanger plate comprises at least one through-opening and said protrusion runs along a part of the groove surrounding said through-opening partly.

10. The heat exchanger according to claim 1, wherein said groove comprises at least a linear section running parallel to an edge of said heat exchanger plate, said protrusion ending out of said linear section.

11. The heat exchanger according to claim 1, wherein said groove comprises side walls and the bottom inner surface of the groove is flat between said side walls and said protrusion.

12. The heat exchanger according to claim 1, wherein at least two protrusions are arranged in said groove, the bottom inner surface of said groove being flat between said protrusions.

13. The heat exchanger according to claim 1, wherein said protrusion is pressed out of the sheet metal of the heat exchanger plate.

14. The heat exchanger according to claim 1, wherein grooves are formed as a hollow the walls forming lowered sections, and the inner surface being a bottom.

15. The heat exchanger according to claim 1, wherein in the region of said protrusion said gasket is compressed more than in a region out of said protrusion due to said gasket being deformed by said protrusion.

16. The heat exchanger according to claim 1, wherein said inner surface bottom further comprises a second protrusion directed to said adjacent heat exchanger plate, and wherein said protrusion and said second protrusion run parallel to each other.

17. The heat exchanger according to claim 1, wherein said protrusion has a height that provides at least 25% more deformation in the thickness of said gasket in the region of said protrusion than in a region out of said protrusion.

18. A heat exchanger comprising:
a stack of heat exchanger plates formed of sheet metal having a three-dimensional structured pattern, wherein a first heat exchanger plate of the stack of heat exchanger plates defines a groove;
a gasket being arranged in said groove and resting against a second heat exchanger plate of the stack of heat exchanger plates, the second heat exchanger plate being adjacent to the first heat exchanger plate;
wherein said groove has a bottom inner surface, said bottom inner surface having a protrusion directed towards said second heat exchanger plate;
wherein said protrusion runs along a curved path in a curved section of the groove;

wherein said groove comprises a linear section running parallel to an edge of said heat exchanger plate, wherein said protrusion is not located in the linear section; and wherein said protrusion has a height that provides at least 10% more deformation in the thickness of said gasket in the region of said protrusion than in a region out of said protrusion.

19. The heat exchanger according to claim 18, wherein a third heat exchanger plate of the stack of heat exchanger plates is adjacent to the first heat exchanger plate, wherein the first, second and third heat exchanger plates are stacked in a stacking direction such that the first heat exchanger plate is between the second and third heat exchanger plates, and wherein there is no gasket positioned between the first heat exchanger plate and the third heat exchanger plate opposite the curved section of the groove of the first heat exchanger plate in the stacking direction.

20. The heat exchanger according to claim 18, wherein said protrusion has a height that provides at least 25% more deformation in the thickness of said gasket in the region of said protrusion than in a region out of said protrusion.

* * * * *